(12) United States Patent
Duval et al.

(10) Patent No.: US 11,091,278 B2
(45) Date of Patent: Aug. 17, 2021

(54) HOOK SYSTEM

(71) Applicant: Bell Helicopter Textron Inc., Fort Worth, TX (US)

(72) Inventors: Sebastien Duval, Terrebonne (CA); Marc Ouellet, Sainte-Sophie (CA)

(73) Assignee: Textron Innovations Inc., Providence, RI (US)

( * ) Notice: Subject to any disclaimer, the term of this patent is extended or adjusted under 35 U.S.C. 154(b) by 684 days.

(21) Appl. No.: 15/949,633

(22) Filed: Apr. 10, 2018

(65) Prior Publication Data

US 2019/0308750 A1    Oct. 10, 2019

(51) Int. Cl.
| | | |
|---|---|---|
| *B64D 1/02* | (2006.01) | |
| *B64F 5/60* | (2017.01) | |
| *B64C 27/04* | (2006.01) | |
| *B66C 1/36* | (2006.01) | |
| *B64D 1/22* | (2006.01) | |
| *B66C 1/34* | (2006.01) | |
| *B64D 1/12* | (2006.01) | |
| *B64D 25/00* | (2006.01) | |

(52) U.S. Cl.
CPC .............. *B64F 5/60* (2017.01); *B64C 27/04* (2013.01); *B64D 1/02* (2013.01); *B64D 1/22* (2013.01); *B66C 1/34* (2013.01); *B66C 1/36* (2013.01); *B64D 1/12* (2013.01); *B64D 25/00* (2013.01)

(58) Field of Classification Search
CPC .... B64F 5/60; B66C 1/36; B66C 1/34; B64D 1/22; B64D 1/02; B64D 1/12; B64D 25/00; B64D 17/383; B64C 27/04
See application file for complete search history.

(56) References Cited

U.S. PATENT DOCUMENTS 2,342,351 A * 2/1944 Lobelle ................... B64D 1/22
                                                              280/504
5,499,785 A    3/1996 Roberts et al.
(Continued)

FOREIGN PATENT DOCUMENTS

EP          0493998 A1    7/1992

OTHER PUBLICATIONS

European Search Report in related European Patent Application No. 18179189.8 dated Dec. 10, 2018, 4 pages.
(Continued)

*Primary Examiner* — Assres H Woldemaryam
(74) *Attorney, Agent, or Firm* — Lightfoot & Alford PLLC

(57) ABSTRACT

A hook system has a mount that includes a first sidewall comprising a concave profile on a longitudinal end of the first sidewall, a second sidewall laterally offset in a fixed location relative to the first sidewall and defining a channel therebetween, the second sidewall having a second concave profile on a longitudinal end of the second sidewall. The hook system also has a first pin structure extending between the first sidewall and the second sidewall and a connector. The connector has a third concave profile, the third concave profile being configured to receive the first pin structure therein. The hook system also includes a second pin structure extending through the connector, wherein each of the first concave profile and the second concave profile are configured to receive the second pin structure therein. The connector is configured to be at least partially received within the channel.

20 Claims, 9 Drawing Sheets

(56) References Cited

U.S. PATENT DOCUMENTS

| | | | |
|---|---|---|---|
| 6,237,976 B1* | 5/2001 | Whitt, Jr. | B66C 1/34 |
| | | | 294/82.1 |
| 6,622,605 B1 | 9/2003 | Snell et al. | |
| 2004/0084917 A1* | 5/2004 | Zollondz | B66C 1/34 |
| | | | 294/82.15 |
| 2006/0175851 A1* | 8/2006 | Snyder | B66C 1/34 |
| | | | 294/82.33 |
| 2014/0112737 A1* | 4/2014 | van der Schans | B66C 1/36 |
| | | | 414/139.6 |
| 2014/0210186 A1* | 7/2014 | Kadnikov | B60D 1/065 |
| | | | 280/513 |
| 2015/0090837 A1* | 4/2015 | Von-Wilmowsky | B64C 25/52 |
| | | | 244/100 R |
| 2016/0009393 A1* | 1/2016 | Repp | G06T 11/001 |
| | | | 701/34.4 |
| 2017/0152042 A1* | 6/2017 | Stucki | B66C 1/36 |
| 2018/0111687 A1* | 4/2018 | Thomas | B64D 1/02 |
| 2018/0370772 A1* | 12/2018 | Autissier | B64D 1/22 |
| 2020/0031632 A1* | 1/2020 | Hanahara | B66C 1/36 |

OTHER PUBLICATIONS

European Exam Report in related European Patent Application No. 18179189.8 dated Jan. 10, 2019, 5 pages.

* cited by examiner

HOOK SYSTEM

BACKGROUND

Fuel systems of aircraft and other vehicles often carry explosive and/or flammable materials. In the case of vehicle crashes, it is desirable that the fuel systems not be punctured or otherwise compromised in a manner that allows fuel to escape the fuel systems. In furtherance of promoting production of vehicles with safer fuel systems, aircraft certification authorities may additionally require drop tests that are to be conducted with external aircraft accessories attached to the aircraft during testing. For example, if an aircraft manufacturer desires to utilize a hook under the belly of the aircraft, the aircraft must be drop tested with the hook installed so that the effects of the presence of the hook on the integrity of the fuel systems can be accounted for prior to certifying the aircraft. Although such drop testing with an installed hook can prove that a hook can be safely used in a crash scenario, there still exists a demand for systems and methods that further improve crashworthiness of aircraft that utilize hooks.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
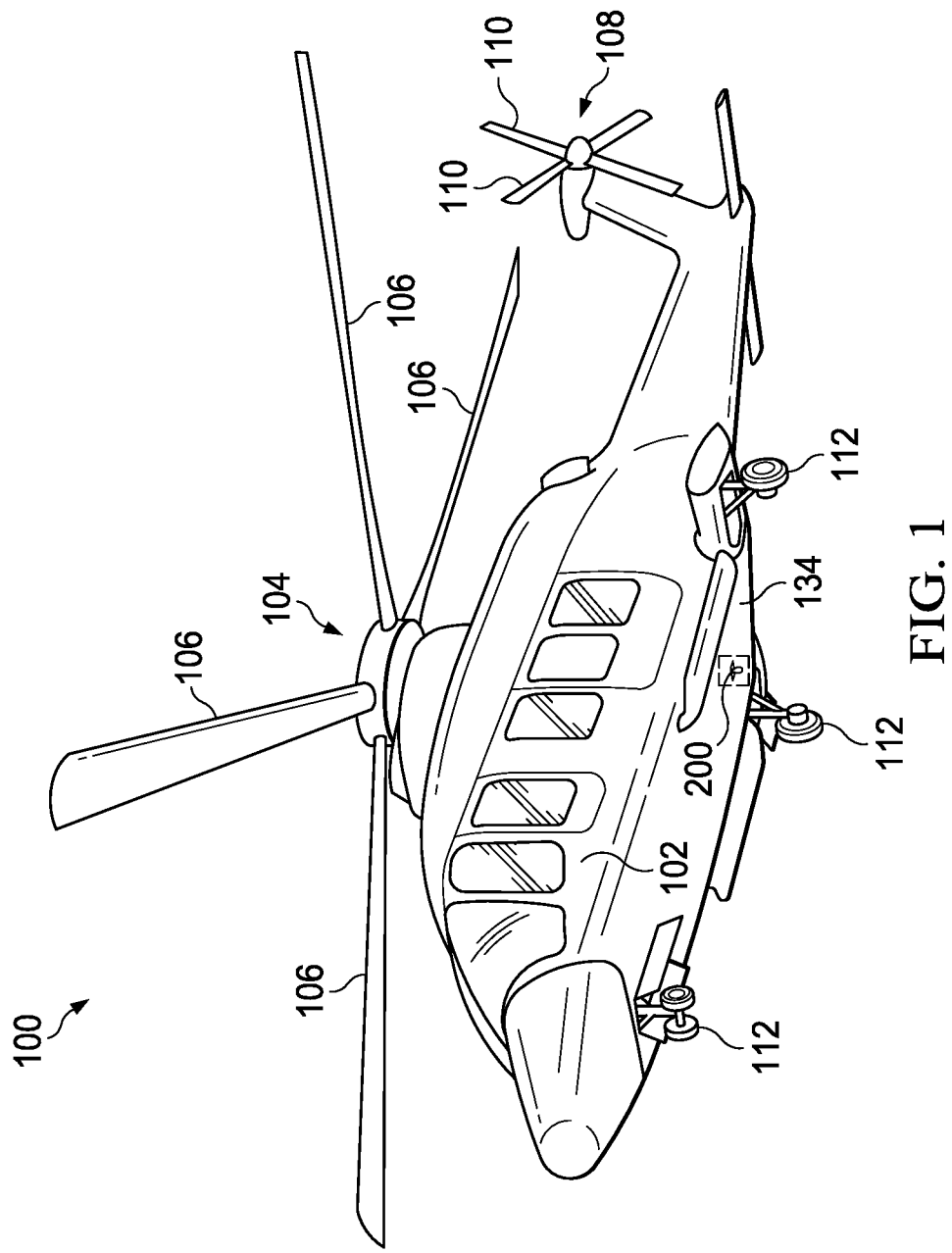
FIG. 1 is an oblique view of an aircraft comprising a hook system according to this disclosure.

Referring now to FIG. 1, a helicopter 100 according to the present disclosure is illustrated. Helicopter 100 comprises a fuselage 102 and a main rotor assembly 104 including main rotor blades 106. Helicopter 100 also comprises a tail rotor assembly 108 including tail rotor blades 110. Helicopter 100 further comprises retractable landing gear 112. The helicopter 100 further comprises a hook system 200.

Figure 2:
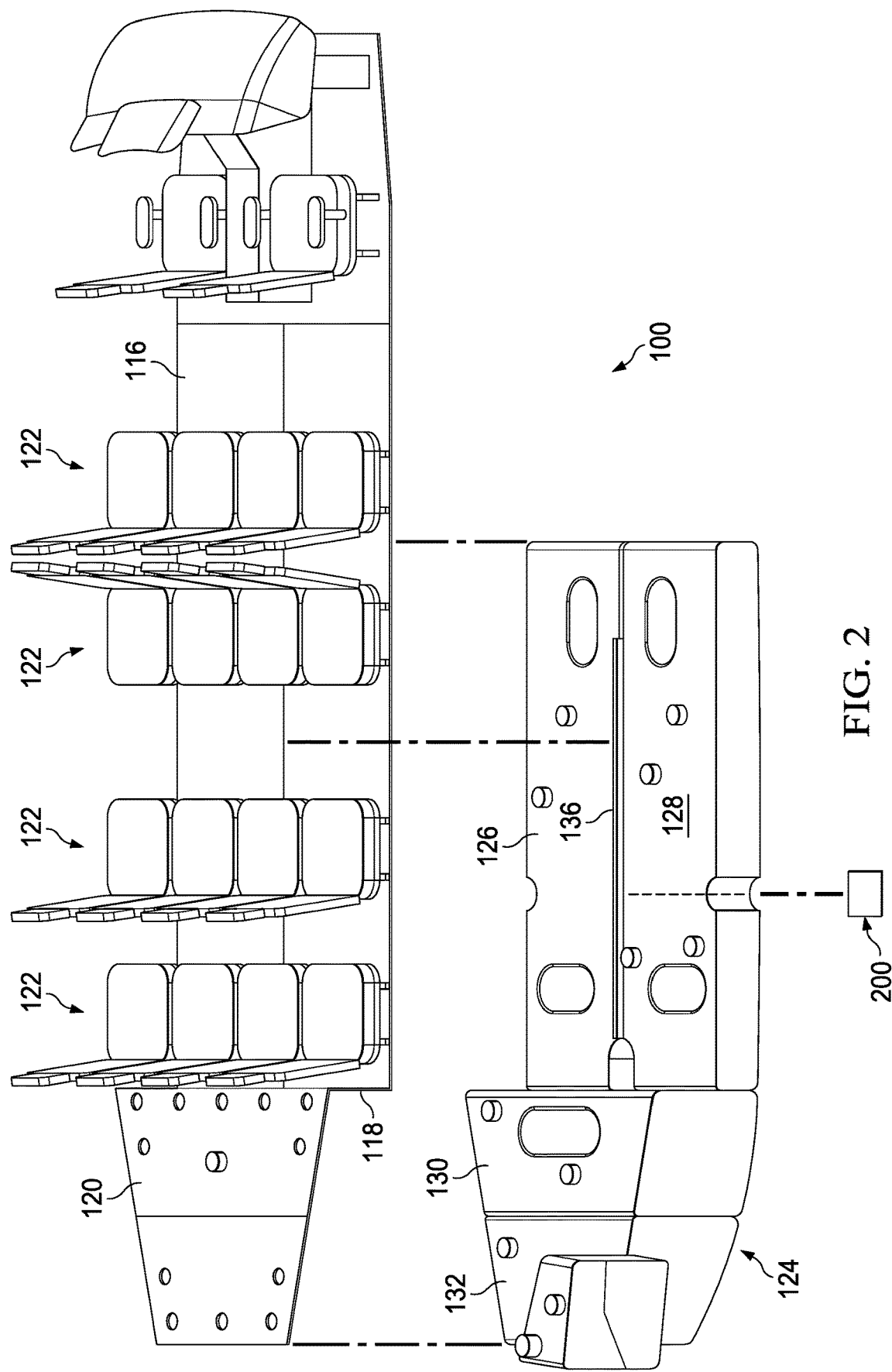
FIG. 2 is an oblique view of a portion of the aircraft of FIG. 1, showing the location of a fuel system relative to a cabin deck and relative to the hook system of FIG. 1.
Figure 3:
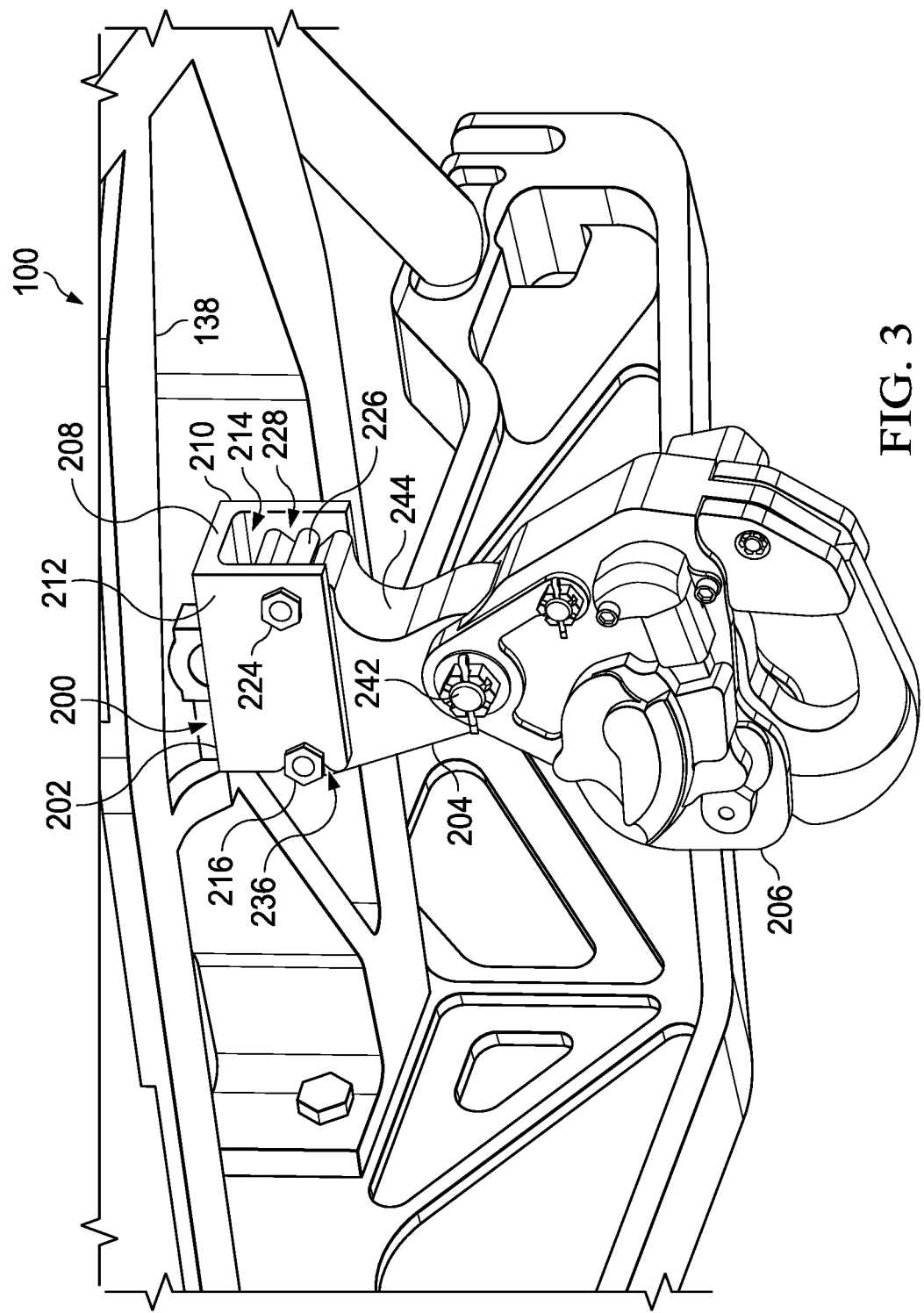
FIG. 3 is an oblique view of a portion of the aircraft of FIG. 1, showing the hook system in greater detail.

Referring now to FIG. 2, an interior of the fuselage 102 comprises a cabin deck 116, a cargo wall 118, and a cargo deck 120. In some embodiments, the fuselage 102 comprises sixteen passenger seats 122 while in other embodiments, the fuselage 102 can comprise equipment related to search and rescue operations. In this embodiment, the helicopter 100 further comprises a fuel system 124 comprising fuel reservoirs including a fore right tank 126, a fore left tank 128, a fore cargo tank 130, and an aft cargo tank 132. In this embodiment, the fore right tank 126 and the fore left tank 128 are located vertically between an exterior skin 134 of the helicopter 100 and the cabin deck 116. Similarly, the fore cargo tank 130 and the aft cargo tank 132 are located vertically between the exterior skin 134 and the cargo deck 120. The fore right tank 126 and the fore left tank 128 are separated by a structural element 136 that is connected between the exterior skin 134 and the cabin deck 116. In this embodiment, the structural element 136 comprises a beam, such as an I-beam.

The hook system 200 is shown as being located vertically below the fuselage 102, and below fore right tank 126 and fore left tank 128. With the hook system 200 being located below the tanks 126, 128, the hook system 200 could be forced upward and into the space occupied by the tanks 126, 128. However, such intrusions into the tanks 126, 128 are prevented by the selectively jettisonable nature of portions of the hook system 200 as described below. Accordingly, the hook system 200 allows use of a hook system without concern for causing catastrophic damage to the helicopter 100 in response to an impact that may force an underside of the fuselage 102 and/or belly-carried accessories in an upward direction.

Referring now to FIGS. 3-10, the hook system 200 is shown in greater detail. The hook system 200 comprises a mount 202 attached to the helicopter 100 on a structural element 138 of the helicopter 100. The structural element 138 is shown as a structural element of an airframe of the helicopter 100. In alternative embodiments, the mount 202 can be attached to the structural element 136. In any case, the mount 202 is secured to the helicopter 100 to transfer the weight of the hook system 200 and any associated hook system 200 payload (any item vertically supported by the hook system 200) to the helicopter 100. The hook system 200 further comprises a sacrificial connector 204 that is selectively attached to the mount 202. The sacrificial connector 204 is configured to be selectively carried by the mount 202 and is further configured for attachment to a hook 206 of the hook system 200. The hook 206 is a conventional cargo hook but in other embodiments, the hook of the hook system 200 can comprise any other hook or device suitable for facilitating the hanging or mounting of a hook system 200 payload.

The mount 202 comprises an upper wall 208 configured with apertures (not shown) suitable to receive fasteners (not shown) therethrough for attachment to the structural element 138. The structural element 138 is similarly provided with suitable apertures for receiving the fasteners, such as bolts, for connecting the mount 202 to the structural element 138. In alternative embodiments, the mount 202 can be welded to a structural element or formed integrally with the structural element. The mount 202 further comprises a first sidewall 210 and a second sidewall 212 that extend downward from the lateral ends of the mount 202. The upper wall 208 and the sidewalls 210, 212 collectively form a generally C-shaped or U-shaped structure that defines a generally longitudinal channel 214. Each of the sidewalls 210, 212 comprise a concave profile 216 that forms a longitudinal end or side of the sidewalls 210, 212 as viewed from the side. The concave profiles 216 each comprise a receiving portion 218, in this embodiment, a curved radius portion, an ejection ledge 220 that extends downward and longitudinally away from the innermost portion of the receiving portion 218, and a capture ledge 221 that extends upward and longitudinally away from the innermost portion of the receiving portion 218. The mount 202 further comprises apertures in each of the sidewalls 210, 212 configured to receive a bolt 222 or other pin-like structure therethrough. The bolt 222 extends through the sidewalls 210, 212 and is secured in place as a function of a head 224 of the bolt 222 disposed outside of the channel 214 and laterally beyond the sidewall 212 and an associated nut (not shown) that is threaded onto a portion of the bolt 222 and disposed outside the channel 214 and laterally beyond the sidewall 210. In this embodiment, a bushing 226 is carried by the bolt 222.

The sacrificial connector 204 generally comprises a plate-like structure having a thickness less than a lateral width of the channel 214 which enables the connector 204 to be received within the channel 214. As viewed from the side, the connector 204 comprises a concave profile 228 having a receiving portion 230, in this embodiment, a curved radius portion, an ejection ledge 232 that extends upward and longitudinally away from the innermost portion of the receiving portion 230, and a capture ledge 233 that extends downward and longitudinally away from the innermost portion of the receiving portion 230. The connector 204 further comprises an aperture longitudinally displaced from the receiving portion 230 that is configured to receive a bolt 234 or other pin-like structure therethrough. The bolt 234 extends through the connector 204 and is secured in place as a function of a head 236 of the bolt 234 disposed beyond a side of the connector 204 and an associated nut (not shown) that is threaded onto a portion of the bolt 234 disposed beyond an opposing side of the connector 204. In this embodiment, bushings 238 are carried by the bolt 234. One of the two bushings 238 is captured between the head 236 and the connector 204 while the other of the two bushings 238 is captured between the connector 204 and the nut. The connector 204 further comprises an aperture 240 for receiving a bolt 242 or other pin-like structure therethrough for connecting the hook 206 to the connector 204. The connector 204 further comprises a concave profile 244 that is provided to ensure that the hook 206 can freely rotate about the bolt 242 over a desired range of motion without being obstructed by the connector 204.

Figure 4:
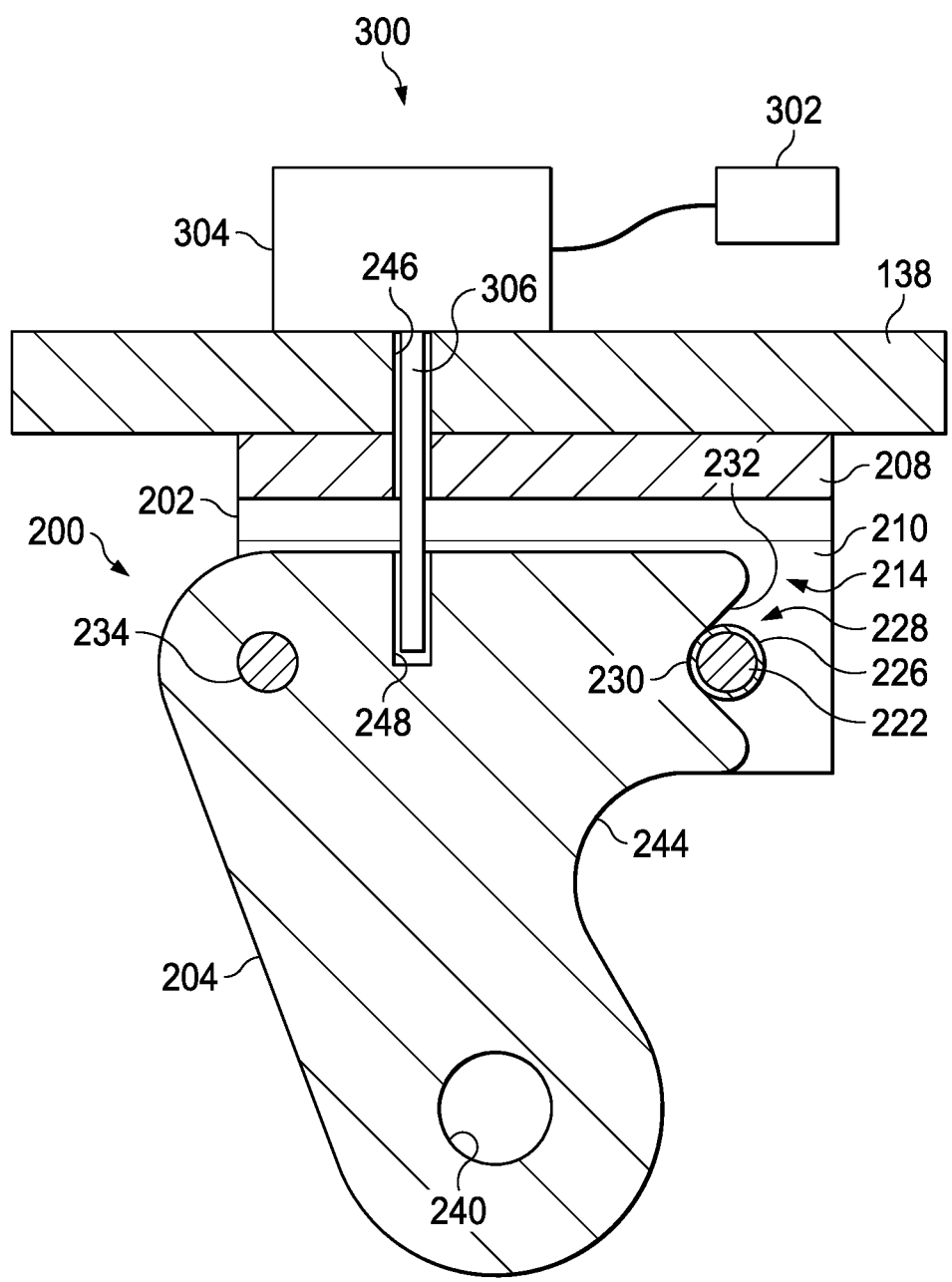
FIG. 4 is a schematic cutaway side view of the hook system of FIG. 1 in a locked configuration.
Figure 5:
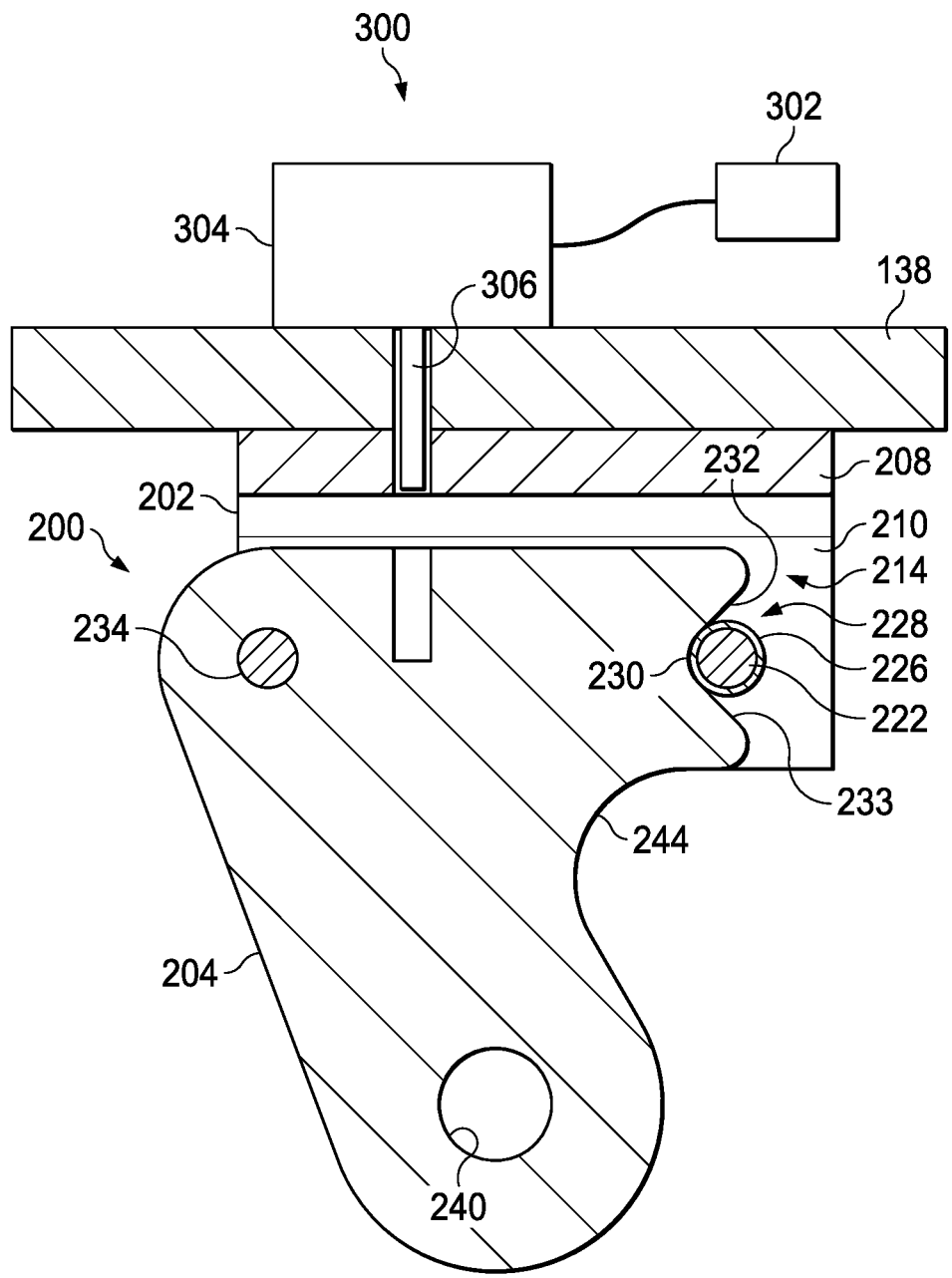
FIG. 5 is a schematic cutaway side view of the hook system of FIG. 1 in an unlocked configuration.
Figure 6:
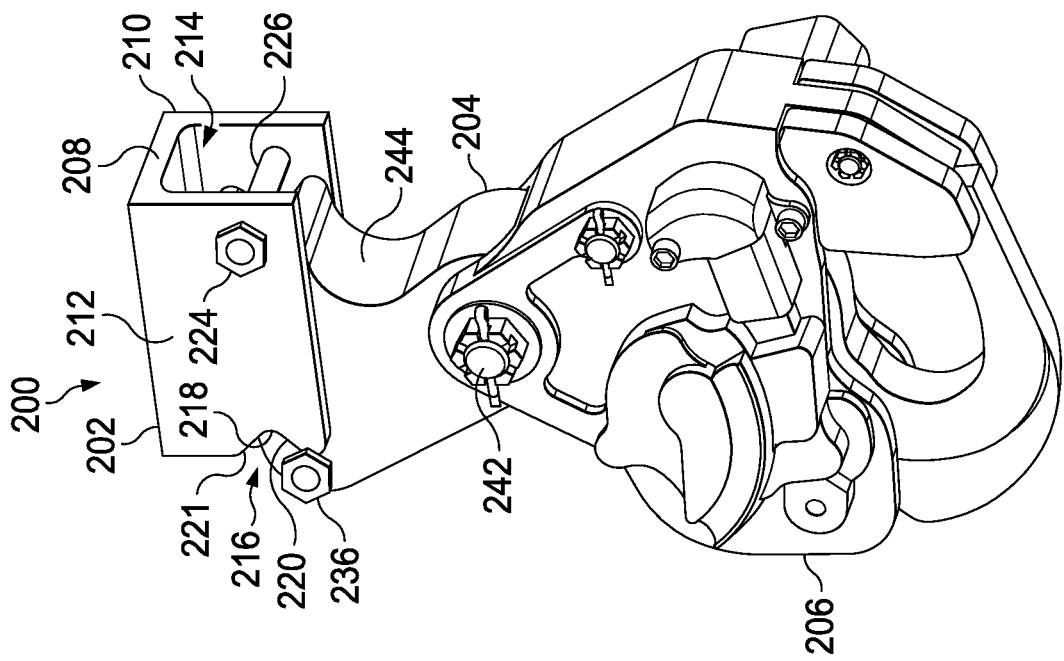
FIG. 6 is an oblique view of a portion of the hook system shown of FIG. 1 shown in isolation and in a locked configuration.
Figure 7:
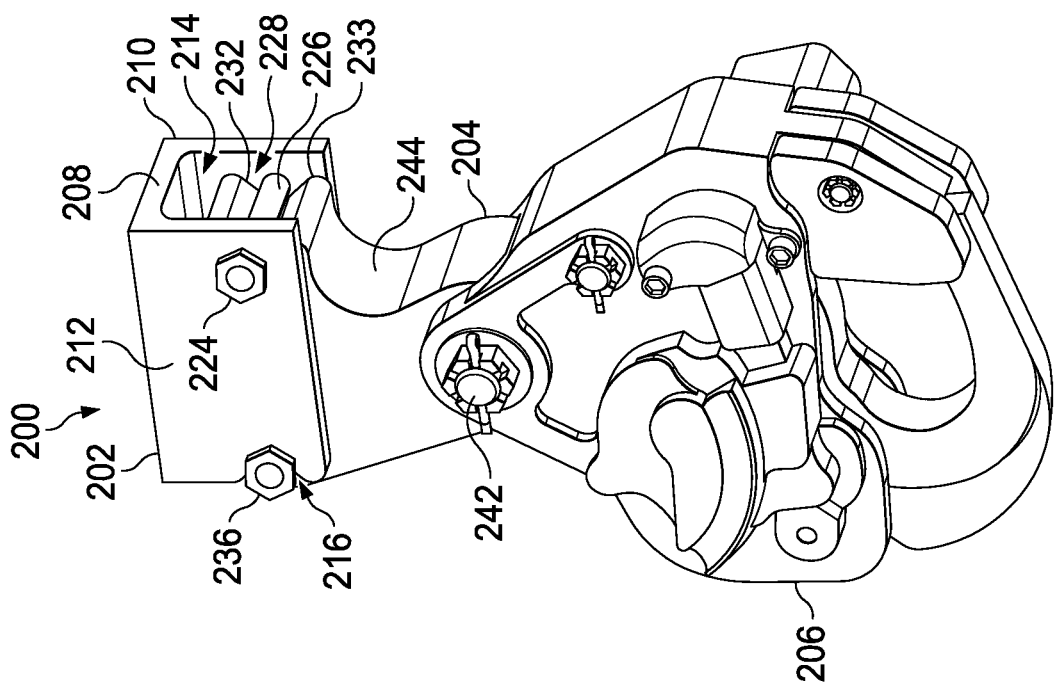
FIG. 7 is an oblique view of the portion of the hook system of FIG. 6 in an unlocked and partially disengaged configuration.

Referring now to FIGS. 4 and 5, the hook system 200 further comprises a release control system (RCS) 300. The RCS 300 comprises a controller 302 and an actuator 304 having a pin 306. In this embodiment, the controller 302 comprises an electrical switching device. The controller 302 can comprise a physical button or switch or alternatively, an electronically switchable output of a flight control system or other user controlled or automatic helicopter control system. In some cases, the controller can comprise a softkey of a control interface of the helicopter 100 and the softkey can be programmed to selectively invoke actuation of the actuator 304. In any case, the controller 302 is configured to be activated to control actuation of the actuator 304. The actuator 304 can be controlled by the controller 302 to move the pin 306 along a pin actuation axis. In this embodiment, the pin 306 can be controlled by the controller 302 to move between an extended position as shown in FIG. 4 and a retracted position as shown in FIG. 5. In alternative embodiments, the controller 302 and the actuator 304 can be replaced by a push-pull type control cable that is connected to the pin 306. Like the controller 302, a portion of the push-pull cable can be located in a portion of the fuselage 102 that is accessible to a user of the helicopter 100. In the extended position, the pin 306 extends through a mount pinhole 246 of the mount 202 that is aligned with the pin actuation axis and into a connector pinhole 248 in the connector 204 that is also aligned with the pin actuation axis. Movement of the pin 306 between the extended position and the retracted position can control installation, removal, and jettisoning of the connector 204 relative to the mount 202 as described in greater detail below.

In operation, the sacrificial connector 204 is connected to the mount 202 and held in place relative to the mount 202 using multiple features of the mount 202, connector 204, and the RCS 300. As shown best in FIGS. 3, 4, and 6, the connector 204 is captured within the channel 214 of the mount 202 between the bushing 226 and the pin 306. When a primarily downward force is applied to the connector 204 (such as a payload force applied to the connector 204 via the hook 206), the downward portion of the force causes the ejection ledge 232 to bear down on the bushing 226 and causes the bushings 238 to bear down on the ejection ledges 220, thereby limiting vertical displacement of the connector 204 relative to the mount 202 in a downward direction. Movement of the connector 204 in an upward direction relative to the mount 202 is limited by the bushings 238 contacting the capture ledge 221 and the capture ledge 233 contacting the bushing 226. The bushings 226, 238 and the ejection ledges 220, 232 are sized appropriately to handle desired anticipated downward forces. While the connector 204 is captured in the manner described above, lateral movement of the connector 204 relative to the mount 202 is limited by the sidewalls 210, 212 and longitudinal movement of the connector 204 relative to the mount 202 is limited by the pin 306 and the bushing 226. With the connector 204 installed relative to the mount 202 as described above, the RCS 300 can be utilized to initiate a jettisoning of the connector 204 and the associated hook 206 and related hook payload if any.

To jettison the connector 204 from the mount 202, the controller 302 can be operated to initiate actuation of actuator 304. The actuator 304 can be caused to retract the pin 306 from the extended position to the retracted position shown in FIG. 5. In the retracted position, the pin 306 is fully removed from the connector pinhole 248 and is substantially or completely removed from the channel 214. In some embodiments, the pin 306 can be removed from the mount pinhole 246 as well, although retraction from the mount 202 is not necessary.

Assuming the helicopter 100 is in a typical orientation relative to ground with the belly of the fuselage 102 generally facing the ground, the weight of the connector 204 (and optionally the weight of the hook 206 and any related hook payload) causes the connector 204 to slide relative to the mount 202. More specifically and with reference to FIG. 7, the jettisoning of the connector 204 is shown with the bushings 238 carried by the connector 204 sliding along the ejection ledge 220 away from the receiving portion 218. Similarly, the jettisoning of the connector 204 causes the connector 204 to slide the ejection ledge 232 to slide away from the bushing 226 carried by the mount 202. Most generally, because the pin 306 no longer completes the capture of the connector 204, the connector 204 is free to begin falling away from the mount 202.

Figure 9:
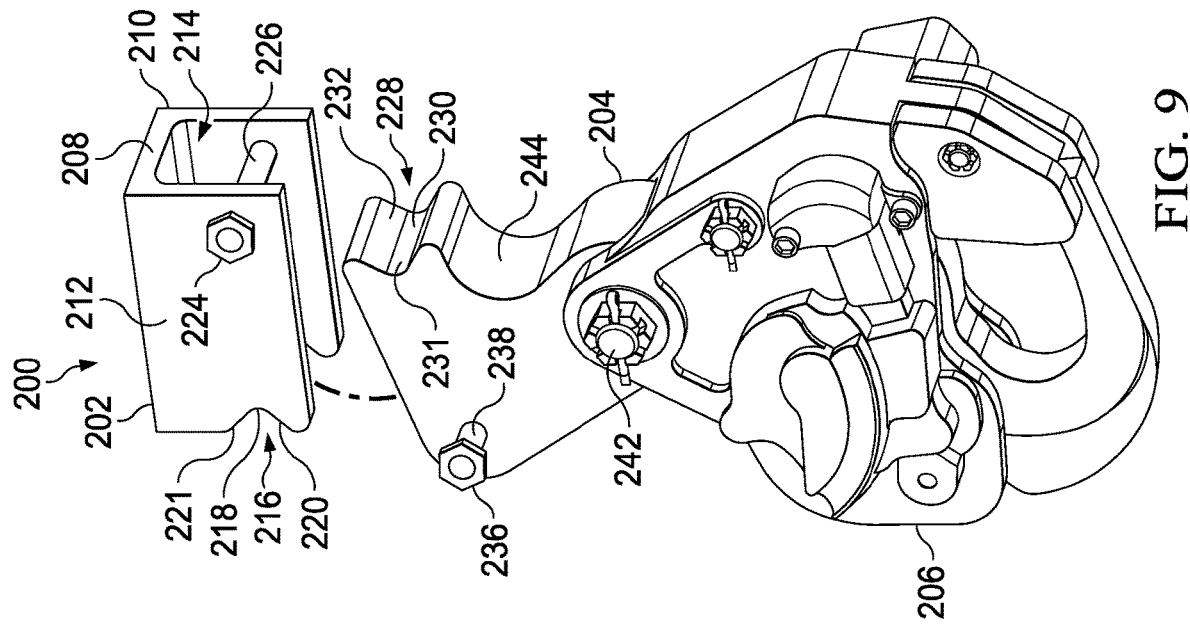
FIG. 9 is an oblique view of the portion of the hook system of FIG. 6 in an unlocked and fully disengaged configuration.
Figure 8:
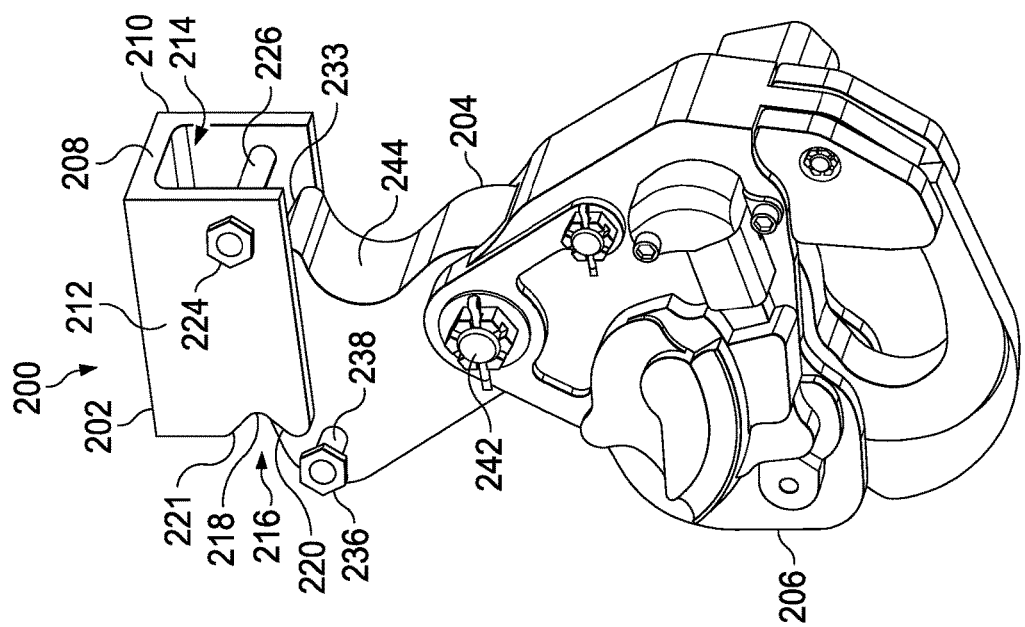
FIG. 8 is another oblique view of the portion of the hook system of FIG. 6 in an unlocked and partially disengaged configuration.
Figure 10:
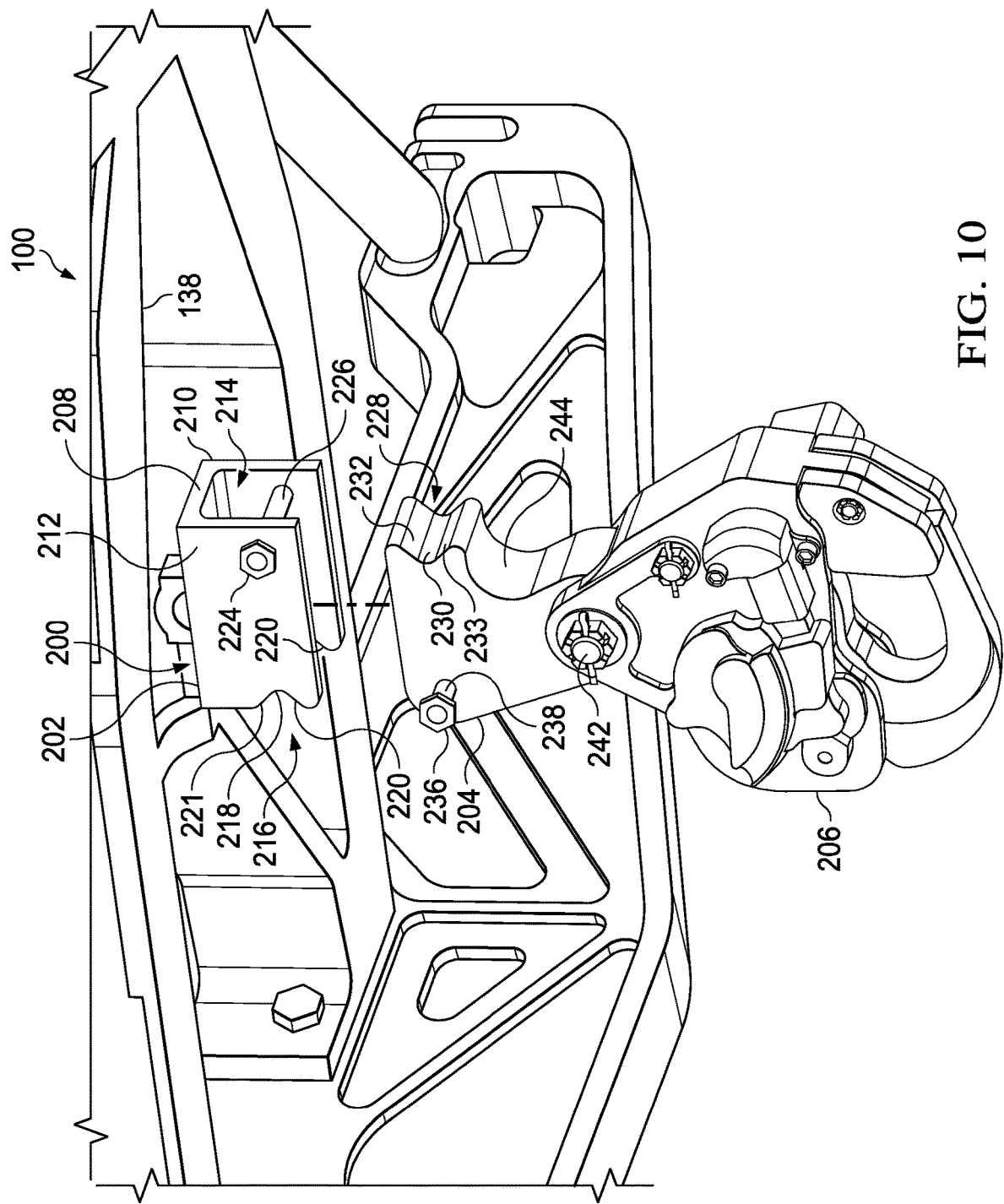
FIG. 10 is an oblique view of a portion of the aircraft of FIG. 1, showing the hook system in greater detail and in a fully disengaged configuration.

Referring to FIG. 8, the connector 204 is shown in a further progressed jettisoning position relative to the mount 202. In this stage of jettisoning, the bushings 238 have moved completely outside the constraints of the receiving portion 218 and from the mount 202. However, a portion of the connector 204 remains within the channel 214 and may be restricted from downward movement by the bushing 226. In cases where the directionality of the generally downward forces cause the connector 204 to continue to interface with the bushing 226, a rotation is eventually and increasingly imparted to the connector 204 until the ejection ledge 232 is oriented substantially vertically, thereby allowing the connector 204 to fall free from the bushing 226 and the mount 202. FIG. 9 shows the connector 204 in a significantly rotated position relative to the mount 202 and in a position that will allow the downward forces to fully remove the connector 204 from the channel 214 without further contact with the bushing 226. In cases where the downward force is almost all downward, the connector 204 may first move first downward and away from the bushing 226 without significant rotation of the connector 204 until the connector 204 can fall directly downward and away from the mount 202. FIG. 10 shows the connector 204 in a fully jettisoned position relative the helicopter 100 and the mount 202. It will be appreciated that the connector 204 can be attached to the mount 202 by performing the relative movements of connector 204, mount 202, and pin 306 required to accomplish the jettisoning, but in substantially the reverse order.

Figure 11:
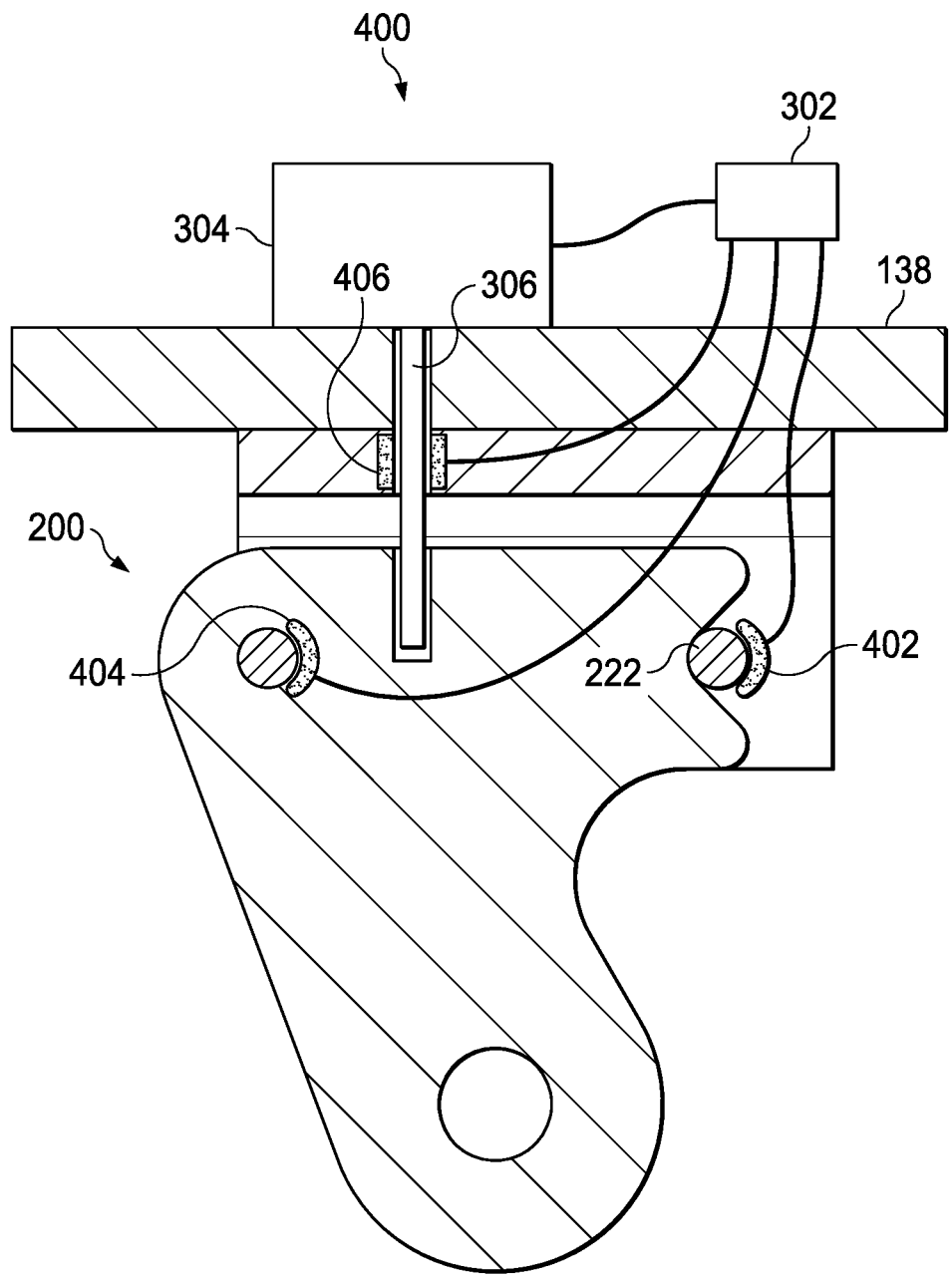
FIG. 11 is a schematic cutaway side view of another hook system in a locked configuration.

Referring now to FIG. 11, a hook system 200 is shown with a release control system (RCS) 400 that is substantially similar to RCS 300, but further comprises destructive charges. The RCS 400 can operate as described above with relation to the RCS 300, but the RCS can additionally or instead cause detonation or ignition of chemical reaction-based charges or explosive devices to cause fragmentation of one or more elements of the hook system 200 and/or RCS 400. As shown, RCS 400 comprises a destructive charge 402 associated with the bolt 222, a destructive charge 404 associated with the bolt 234, and a destructive charge 406 associated with the pin 306. The exact location(s) of the charges 402, 404, 406 can be varied relative to that shown so long as the destructive force of the charges 402, 404, 406 are sufficient to destroy and sufficiently fragment the associated components in a manner that allows the connector 204 to fall away or be removed from the mount 202 without reliance on the actuator 304. In some cases, use of the charges 402, 404, 406 may be reserved for emergency situations wherein a signal to initiate the charges 402, 404, 406 is automatically sent in response to a system of the helicopter 100 indicating a high likelihood of a crash. In some cases, the charges 402, 404, 406 may be manually utilized in cases where jettisoning the connector 204 using the actuator 304 has failed.

While the hook system 200 is disclosed above and described primarily as a system for jettisoning a connector 204 and associated hook 206 from the helicopter 100 during flight to protect the helicopter 100 from unnecessary damage upon a belly impact, the same system is nonetheless useful as a quick connection system. The same system 200 can be utilized outside of emergency situations to allow easy installation and removal of a hook 206 or other device relative to the helicopter 100. Further, while the system 200 is described above as being utilized on a helicopter 100, the same system 200 can be utilized on any other aircraft or vehicle where remote and/or automated control or removal of an accessory carried by a vehicle is desired.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A hook system, comprising:
    a mount, comprising:
        a first sidewall comprising a first concave profile on a longitudinal end of the first sidewall;
        a second sidewall laterally offset in a fixed location relative to the first sidewall and defining a channel therebetween, the second sidewall comprising a second concave profile on a longitudinal end of the second sidewall;
    a first pin structure extending between the first sidewall and the second sidewall;
    a connector, comprising:
        a third concave profile, the third concave profile being configured to receive the first pin structure therein; and
        a second pin structure extending through the connector, wherein each of the first concave profile and the second concave profile are configured to receive the second pin structure therein; and
    a hook carried by the connector;
    wherein the connector is configured to be at least partially received within the channel; and wherein when the connector is moved away from the first pin a distance sufficient to allow rotation of the second pin vertically beyond both the first concave profile and the second concave profile, the connector can be moved downward and separated from the mount.

2. The hook system of claim 1, further comprising:
an upper wall from which each of the first sidewall and the second sidewall extend.

3. The hook system of claim 1, further comprising:
a release control system (RCS), comprising a third pin structure that is selectively movable relative to the connector.

4. The hook system of claim 3, wherein the connector comprises a hole for selectively receiving the third pin structure.

5. The hook system of claim 4, wherein the third pin structure is selectively movable so that the third pin structure can be completely removed from the hole of the connector and from the channel.

6. The hook system of claim 3, wherein the RCS further comprises an actuator configured to move the third pin structure.

7. The hook system of claim 6, wherein the RCS further comprises a controller configured to control the actuator.

8. The hook system of claim 7, wherein the controller comprises an electric switch or a softkey.

9. The hook system of claim 3, wherein the RCS further comprises a push-pull type cable configured to move the third pin structure.

10. The hook system of claim 1, further comprising a destructive charge configured to selectively destroy at least one component of the hook system.

11. A helicopter, comprising:
a fuselage; and
a hook system disposed below a majority of the fuselage, comprising:
  a mount, comprising:
    a first sidewall comprising a first concave profile on a longitudinal end of the first sidewall;
    a second sidewall laterally offset in a fixed location relative to the first sidewall and defining a channel therebetween, the second sidewall comprising a second concave profile on a longitudinal end of the second sidewall;
  a first pin structure extending between the first sidewall and the second sidewall;
  a connector, comprising:
    a third concave profile, the third concave profile being configured to receive the first pin structure therein; and
    a second pin structure extending through the connector, wherein each of the first concave profile and the second concave profile are configured to receive the second pin structure therein; and
  a hook carried by the connector;
  wherein the connector is configured to be at least partially received within the channel; and
  wherein when the connector is moved away from the first pin a distance sufficient to allow rotation of the second pin vertically beyond both the first concave profile and the second concave profile, the connector can be moved downward and separated from the mount.

12. The helicopter of claim 11, further comprising:
an upper wall from which each of the first sidewall and the second sidewall extend.

13. The helicopter of claim 11, further comprising:
a release control system (RCS), comprising a third pin structure that is selectively movable relative to the connector.

14. The helicopter of claim 13, wherein the connector comprises a hole for selectively receiving the third pin structure.

15. The helicopter of claim 14, wherein the third pin structure is selectively movable so that the third pin structure can be completely removed from the hole of the connector and from the channel.

16. The helicopter of claim 13, wherein the RCS further comprises an actuator configured to move the third pin structure.

17. The helicopter of claim 16, wherein the RCS further comprises a controller configured to control the actuator.

18. The helicopter of claim 17, wherein the controller comprises an electric switch or a softkey.

19. The helicopter of claim 13, wherein the RCS further comprises a push-pull type cable configured to move the third pin structure.

20. The helicopter of claim 11, further comprising a destructive charge configured to selectively destroy at least one component of the hook system.

* * * * *